(12) United States Patent
Firhoj et al.

(10) Patent No.: US 8,593,083 B2
(45) Date of Patent: Nov. 26, 2013

(54) SYSTEM, METHOD AND PORTABLE CONTROLLER FOR PROGRAMMING AND CALIBRATION OF A PLURALITY OF LIGHT SOURCE UNITS FOR PHOTO-REACTIVE/CURING APPLICATIONS

(75) Inventors: Allan Firhoj, Georgetown (CA); John Joseph Kuta, Oakville (CA)

(73) Assignee: Lumen Dynamics Group Inc., Mississauga (CA)

( * ) Notice: Subject to any disclaimer, the term of this patent is extended or adjusted under 35 U.S.C. 154(b) by 173 days.

(21) Appl. No.: 13/146,728

(22) PCT Filed: Feb. 9, 2010

(86) PCT No.: PCT/CA2010/000171
§ 371 (c)(1),
(2), (4) Date: Jul. 28, 2011

(87) PCT Pub. No.: WO2010/096896
PCT Pub. Date: Sep. 2, 2010

(65) Prior Publication Data
US 2012/0019171 A1  Jan. 26, 2012

Related U.S. Application Data

(60) Provisional application No. 61/155,081, filed on Feb. 24, 2009.

(51) Int. Cl.
*H05B 37/00* (2006.01)
(52) U.S. Cl.
USPC .......................................... 315/312; 315/307
(58) Field of Classification Search
None
See application file for complete search history.

*Primary Examiner* — Crystal L Hammond
(74) *Attorney, Agent, or Firm* — Thomas Adams

(57) ABSTRACT

A system, method, and portable or mobile controller are provided for network management of functions such as monitoring, control, programming, and calibration of a plurality of (UV) light sources, for photo-reactive and photo-curing applications. Beneficially, a reliable and controlled closed-loop feedback network is provided in which a dose of light, or exposure profile, for e.g. spot curing, can be programmed into a light source unit to perform a highly repeatable operation across a single or multiple work stations. The system is scalable up to 1000's of workstations.

32 Claims, 15 Drawing Sheets

SYSTEM, METHOD AND PORTABLE CONTROLLER FOR PROGRAMMING AND CALIBRATION OF A PLURALITY OF LIGHT SOURCE UNITS FOR PHOTO-REACTIVE/CURING APPLICATIONS

CROSS-REFERENCE TO RELATED APPLICATIONS

This application claims priority from U.S. Provisional patent application No. 61/155,081 filed Feb. 24, 2009; this application is also related to U.S. Pat. No. 7,335,901 and US Patent publication No. 2008/0197300 to Kayser, entitled "Method for calibrating light delivery systems, light delivery systems, and a radiometer for use therewith"; U.S. Pat. No. 5,521,392 to Kennedy entitled "Light cure system with closed loop control and workpiece recording"; U.S. Pat. No. 6,333,602 and U.S. Pat. No. 6,847,170 to Kayser, entitled "Smart light source with integrated operational parameters data storage capability", all of which are incorporated herein by reference.

TECHNICAL FIELD

This invention relates to light sources for spot curing of (UV) photo-activated adhesives and materials for manufacturing processes, and more particularly to a system, method and portable controller for network management of a plurality of networked light sources for photo-curing applications providing for monitoring, calibration, control and programming.

BACKGROUND

Numerous, high volume manufacturing applications exist in which UV light sources are used as part of the manufacturing process for spot curing of UV activated adhesives or other materials. Typical examples of processes that use UV spot light sources for adhesive curing, include lens camera module assemblies used in cellular telephones, and hard disk drive pick-up assemblies. The parameters of these manufacturing processes are tightly controlled to ensure high product quality and predictable manufacturing yields. It is not uncommon, for instance, for a single manufacturing plant to have hundreds of separate UV light sources. Typically it is difficult to ensure the consistency of the output of these myriad of light sources, both in unit-to-unit comparisons, as in comparisons within a single unit taken over an extended period of time. In addition, cost becomes a significant factor in equipping a manufacturing facility with sophisticated, stand-alone curing systems.

Tight control of the manufacturing processes places specific requirements on the equipment used on the manufacturing line. For UV light sources, this typically includes an ability to adjust the optical output of the light source. Adjustment is required during the process development stage of the manufacturing process to optimize the curing parameters. While process optimization is being performed, typically only a small number of curing systems are used. Once the process has been performed, the parameters such as the flux of light and exposure time are recorded. In order for this process to be replicated on other curing systems, the UV curing system must have first the means to generate the light, a means to regulate when and how much light is delivered to curing site, a means to program and store these parameters within the unit, and a processing means to read the stored parameters and execute the curing process when required. In addition, more advanced systems offer the ability to regulate the optical output over the course of multiple exposures to ensure that degradation in the UV light source, over time, e.g. due to aging effects, does not influence the curing process.

In such systems, where each light sources is associated with its own controller, e.g. at each individual workstation, each light unit must be individually calibrated, and adjusted to set or store process parameters, thus requiring monitoring and calibration to ensure consistency and provide a highly repeatable operation across a single or multiple work stations.

Closed loop feedback UV curing systems are available in either relative or calibrated form. In the relative form, the closed loop feedback signal is a relative measure of the output of the UV system or some other surrogate indicator of output. For the more advanced systems, the feedback signal is measured in absolute units, such as Watts (see for example, U.S. Pat. No. 5,521,392 to Kennedy. The advantage of calibrating a closed loop feedback signal is that it allows for the easy programming and monitoring of the curing process on multiple UV curing units, which as discussed above, is a difficulty within manufacturing facilities utilizing many UV systems, &/or multiple systems located at geographically distant facilities.

For example, a "Method for calibrating light delivery systems, light delivery systems, and a radiometer for use therewith" is described in U.S. Pat. No. 7,335,901 to Kayser (AP1224US) and US Patent publication no. 2008/0197300 to Kayser (AP1224US CIP), which are commonly owned with the present invention. The handheld portable radiometer disclosed therein facilitates monitoring and calibration of light sources, which may be e.g. conventional mercury lamps or LED arrays. Each light source has its own control system for operation and programming, requiring that each light source has a significant amount of intelligence and processing power.

The features described above result in complex and expensive curing systems, each of which must be separately calibrated, monitored and programmed.

Efforts by industry to date to reduce the cost of these systems can be divided into two categories. The first category involves creating multiple sources of UV light controlled by a single control unit. For example, this may be achieved either by taking a single, higher powered light source such as a mercury arc lamp (typical optical power generation of >10 W), and dividing the energy provided by the lamp between multiple light delivery means, such as bi- or multi-furcated optical light-guides. Alternatively, several lower powered sources of UV light, such as UV LEDs (typical optical power generation of <2 W), may be connected to the same controller. The controller in this latter case can provide control signals and function to monitor the individual sources, or it can also provide electrical drive power to the individual sources. Another approach to reduce the cost of UV curing systems has been to sacrifice features, typically by reducing the control capabilities of each unit. However, this approach results in less control of the manufacturing process.

In known systems for controlling a plurality of light sources, each light source has limited functionality, and a central control system contains intelligence for control of multiple light sources. For example, Hamamatsu has introduced a networked LED system with a controller based on LED's. This system has the advantage of being able to control multiple UV light sources (i.e. up to 8 units) independently and simultaneously, but suffers from the limitation that the light sources must be spatially located within the length of the intervening connecting cable. In addition, the fixed and central location of the controller in the LED light source network makes it difficult to perform optical calibrations of the individual UV LED light sources. Calibration must be performed with a separate radiometer unit, the radiometer signal either manually or electronically being fed back to the controller unit. As mentioned above, such a system only partially addresses the above-mentioned problems of monitoring, calibrating, and controlling or programming tens or hundreds of light sources in a manufacturing environment.

Thus improved systems and methods are needed for managing a large number of light sources for photo-curing applications, particularly in a manufacturing environment requiring tight control of process parameters for consistency in processing, and/or where the light sources may be distributed at workstations over a large area, or located in multiple geographic locations, so as to allow for a highly repeatable operation across a single or multiple work stations

SUMMARY OF INVENTION

The present invention seeks to eliminate, or at least mitigate, the disadvantages of known systems and methods for managing a plurality of light sources, or at least provide an alternative.

Thus, according to one aspect of the present invention, there is provided a system for management of a plurality of light source units for photo-activated/photo-curing applications, comprising: the plurality of light source units each having a data communications interface; a mobile controller having a data communications interface and control means for selectively establishing a network connection a light source units and for monitoring, calibration, and programming each light source unit; each light source unit being remotely programmable by the controller via said network connection to program an exposure profile, and operable independently of the controller for delivering said programmed exposure profile, and the mobile controller comprising a user interface for controlling, monitoring, calibration, and programming of each of the plurality of light source units.

For example, each light source unit may comprise a visible or UV LED or LED array or other solid-state light source. Preferably, mobile controller comprises means for programming each light source unit with an exposure profile, or curing profile, comprising an intensity and an exposure time. Optionally, the mobile controller further comprises a radiometer having an optical port and/or an input port for coupling to a remote radiometer for monitoring optical output from at least one of the plurality of programmable light source units.

Advantageously, each light source unit has a unique identifier, and the controller comprises control means for establishing communication with a selected one of the at least one of the plurality of light source units connected to the controller for at least one of monitoring, calibration, control, and programming of said selected light source unit. The interface means may provide for temporarily establishing a wired or wireless network connection for bi-directional communication with each of the plurality of light source units, e.g. for sequential or simultaneous connection of individual or multiple light source units.

Preferred embodiments of the system may comprise a central processing unit, e.g. a PC, and the controller further comprises means for establishing a network connection with the central processing unit for transferring of exposure profile data and light source data between the central processing unit and individual light source units via the controller.

Another aspect of the invention provides a light source unit having a communications interface for network connection to a controller, and the light source unit being remotely programmable by the controller via said network connection to program an exposure profile, and operable independently of the controller for delivering said programmed exposure profile. The light source unit may also comprise power connection and control means; memory means for storing at least one exposure profile comprising time, intensity and power information for delivering a programmed photon dose; and activation means for executing a stored exposure profile. When the light source unit is capable of storing a plurality of exposure profiles, it also comprises means for selecting one of said plurality of stored exposure profiles.

Yet another aspect of the invention provides a mobile controller for management of a network comprising a plurality of remotely programmable light source units each having a communications interface, the controller comprising: interface means for establishing bi-directional communication with individual ones of the plurality of remotely programmable light sources; control means for monitoring, calibrating and programming said light source units, and a user interface for managing said communication, monitoring, calibration and programming means.

The interface means may further comprises means for communicating with a central processing unit, and for transferring of exposure profile data and light source data between the central processing unit and individual light source units via the controller.

A further aspect of the invention provides a method for managing a plurality of remotely programmable light source units, each having a communications interface, the method comprising, via a mobile controller, performing the steps of: establishing a network connection with at least one of said plurality of remotely programmable light source units; identifying a selected one of said plurality of light source units; selecting one of monitoring, calibrating and programming functions; performing a selected function of at least one of monitoring, calibrating and programming the selected light source unit.

Programming the selected light source unit may comprise transferring, via said network connection, exposure profile data from the controller into memory of the selected light source. When exposure profile data is stored by a central processing unit, transferring the data to the selected light source comprises retrieving data from the central processing unit, and then transferring said data, via said network connection, from the mobile controller to the light unit. Calibrating the selected light source unit may comprise sampling output of a radiometer coupled to a selected light source unit, determining the calibration status of the selected light source unit, and if calibration is required, transferring calibration data to the selected light source unit. Monitoring the selected light source unit may comprise retrieving light source data and status information, and displaying or otherwise processing said information at the controller.

A yet further aspect of the invention provides a network management system for managing a network of a plurality of remotely programmable light source units, the system comprising: a central processing unit, and at least one mobile controller for interfacing the central processing unit and the plurality of remotely programmable light source units; the mobile controller comprising interface means for establishing communication with selected individual ones of said plurality of light source units, and control means for monitoring, calibration and programming thereof, and a user interface managing said interface means and control means.

Thus, a system, method, and portable or mobile controller are provided for network management of functions such as monitoring, control, programming, and calibration of a plurality of light sources, comprising e.g. a UV or visible LED, or LED array, or other solid state light source, for photo-activated or photo-reactive processes and photo-curing applications. Advantageously, a reliable and controlled closed-loop feedback network is provided in which a dose of light, or exposure profile, for e.g. spot curing, or other photo-reactive or photo-initiated process, can be programmed into a light source unit to perform a highly repeatable operation across a single or multiple work stations. The system is scalable up to 1000's of workstations.

The foregoing and other objects, features, aspects and advantages of the present invention will become more apparent from the following detailed description, taken in conjunction with the accompanying drawings, of preferred embodiments of the invention, which description is by way of example only.

BRIEF DESCRIPTION OF DRAWINGS

In the drawings, identical or corresponding elements in the different Figures have the same reference numeral.

DESCRIPTION OF PREFERRED EMBODIMENTS

Figure 1A:
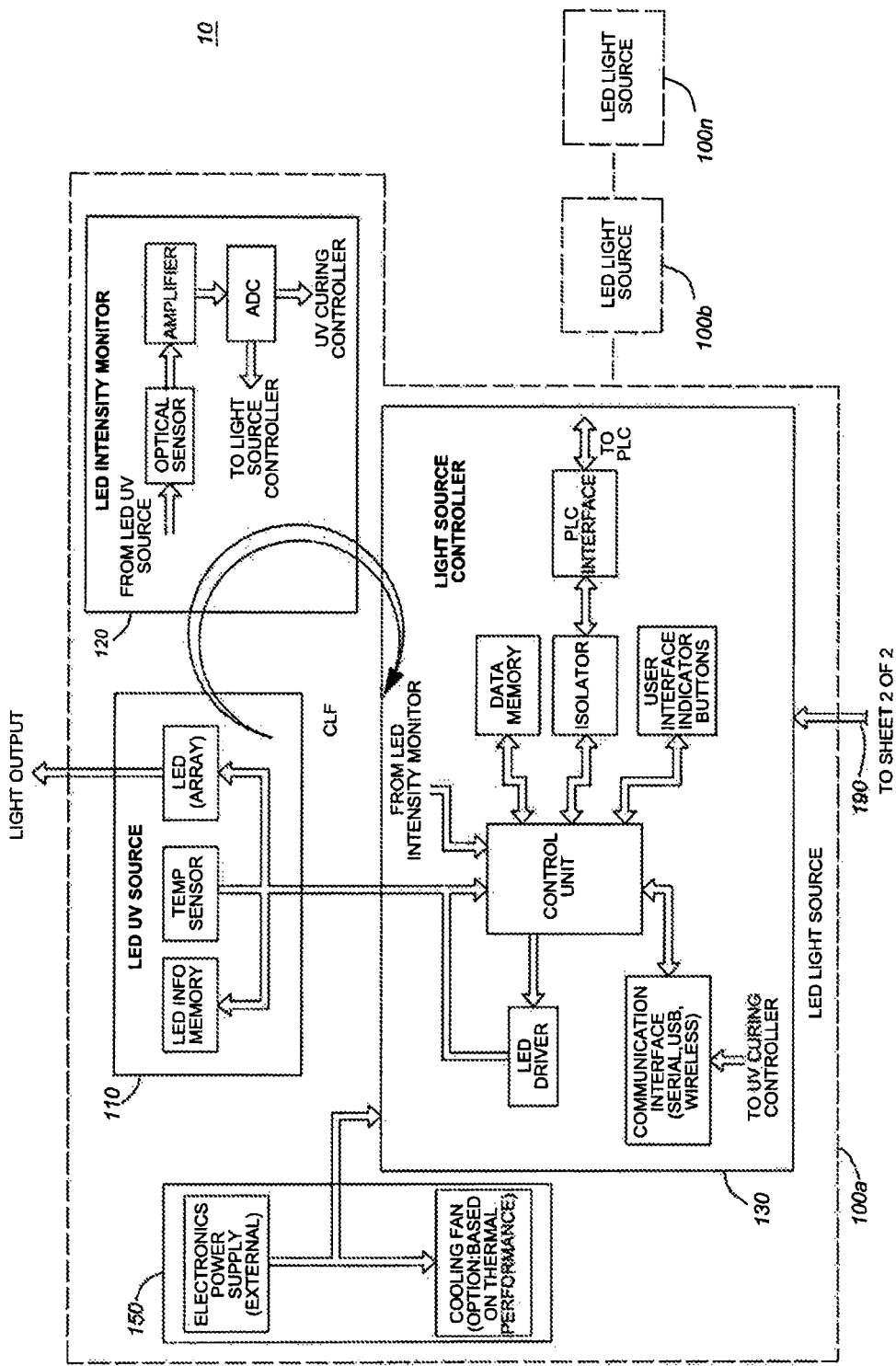
FIG. 1A illustrates an enlarged schematic view of a LED light source 100n, as shown in FIG. 1.
Figure 1B:
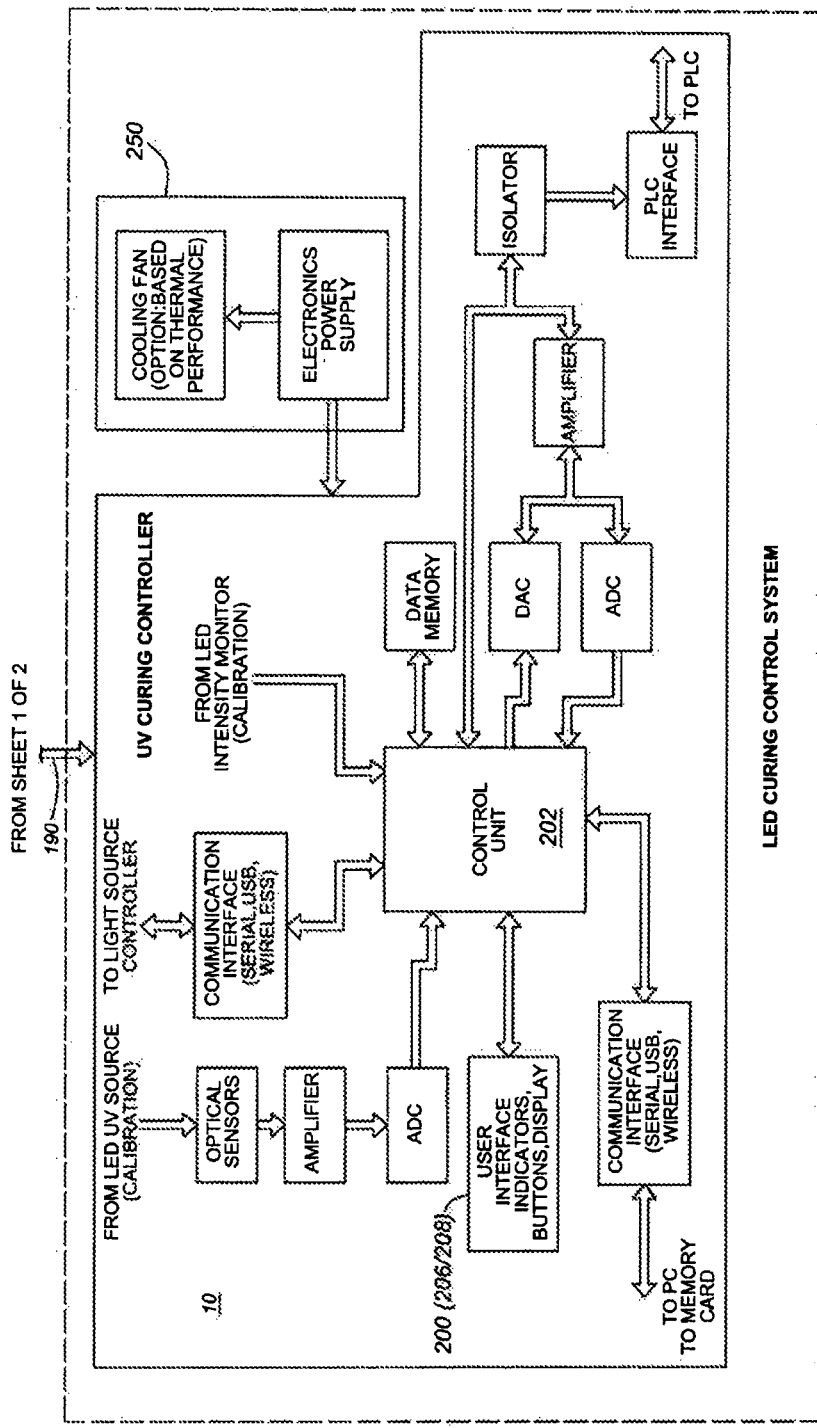
FIG. 1B illustrates schematically an enlarged schematic view of the LED curing control system 200 as shown in FIG. 1.

FIGS. 1A and 1B illustrate a system 10 comprising a plurality (n) of light sources 100a, 100b, . . . 100n, for example UV LED light sources for UV spot curing, and a UV LED curing controller 200, which preferably, may be a portable hand-held device, for controlling each of the light sources 100a, 100b, . . . 100n. Typically each of these UV LED light source units 100a . . . 100n would be associated with, or located at, one of a plurality of workstations (not shown) for carrying out a particular UV curing process or operation, e.g. executing a particular curing profile, or more generally an exposure profile, comprising a particular exposure time and intensity. To provide consistency in operations and processing at different workstations, or at each workstation over time, it is usually necessary to provide regular monitoring and calibration of each light source 100a . . . 100n, e.g. to compensate for any changes in output over the lifetime of the UV light sources, or under different operating conditions. In some manufacturing environment, each workstation may be programmed to perform one specific UV curing task or operation. In other applications, each UV light source, 100a . . . 100n, may be programmable for carrying out one of several curing processes, e.g. using different doses and exposures. Thus each light source unit 100n comprises a LED light source 110, a LED intensity monitor 120, a light source controller 130 with limited functionality for operating the light source unit independently of the controller 200, and a power supply unit 150.

To program, and monitor and calibrate each UV light source 100a . . . 100n, the UV curing control system comprises a controller 200, which may be removably connected to at least one of the individual LED light sources 100a . . . 100n, via a wired or wireless connection 190. The LED curing controller 200 is preferably a portable handheld unit, having a control unit 202 including a processor, a user interface 204, which may include a graphical user interface 206 and a keypad 208 (see FIG. 3), and memory 260. The controller 200 includes a control unit 202, with a communication interface 190 for the light source controller 130, an external communication interface such as a serial, USB or wireless port 210, and a power supply 250, with cooling means such as a fan, if needed. The controller 200 also has an optical input 248 of a radiometer comprising one or more optical sensor(s) 240, amplifier 242 and ADC 244. A DAC 282, ADC 284, amplifier 286, isolator 288 are also provided for a PLC interface 290 to an external programmable logic controller (PLC) 292 using digital, e.g. TTL control signals.

Some elements of the controller 200 of the present embodiment are similar to the radiometer unit 38 described in US patent publication no. 2008/0197300 (see FIG. 2 thereof, and related description), which is incorporated herein by reference. However the latter controller provided monitoring and calibration functions only. On the other hand, the portable controller unit 200 also includes additional functionality, which allows for control and programming of the light source units, which facilitates centralized, network based management of a plurality of distributed and independently operable light source units 100n.

Thus, as will be described with reference to FIGS. 1A and 1B, and FIGS. 2, 3 and 4, in a preferred embodiment, there is provided a networked system comprising a handheld (remote) controller 200, and a plurality of distributed and independently operable UV light sources 100a . . . 100n, each with processing capacity and memory to perform a limited number of functions, and a simple user interface to enable a local user or operator to operate the UV light source, independently of the controller, to provide these functions. Each of the light units 100a . . . 100n has its own power supply 150, limited intelligence, and simple user interface, but may be connected to the controller 200 to provide a user interface with additional functionality, thus centralizing monitoring, calibration and control functions, and simplifying and reducing the cost of each individual light unit 100a . . . 100n, while providing for a full range of control and monitoring functions via the detachable controller 200.

Figure 1C:
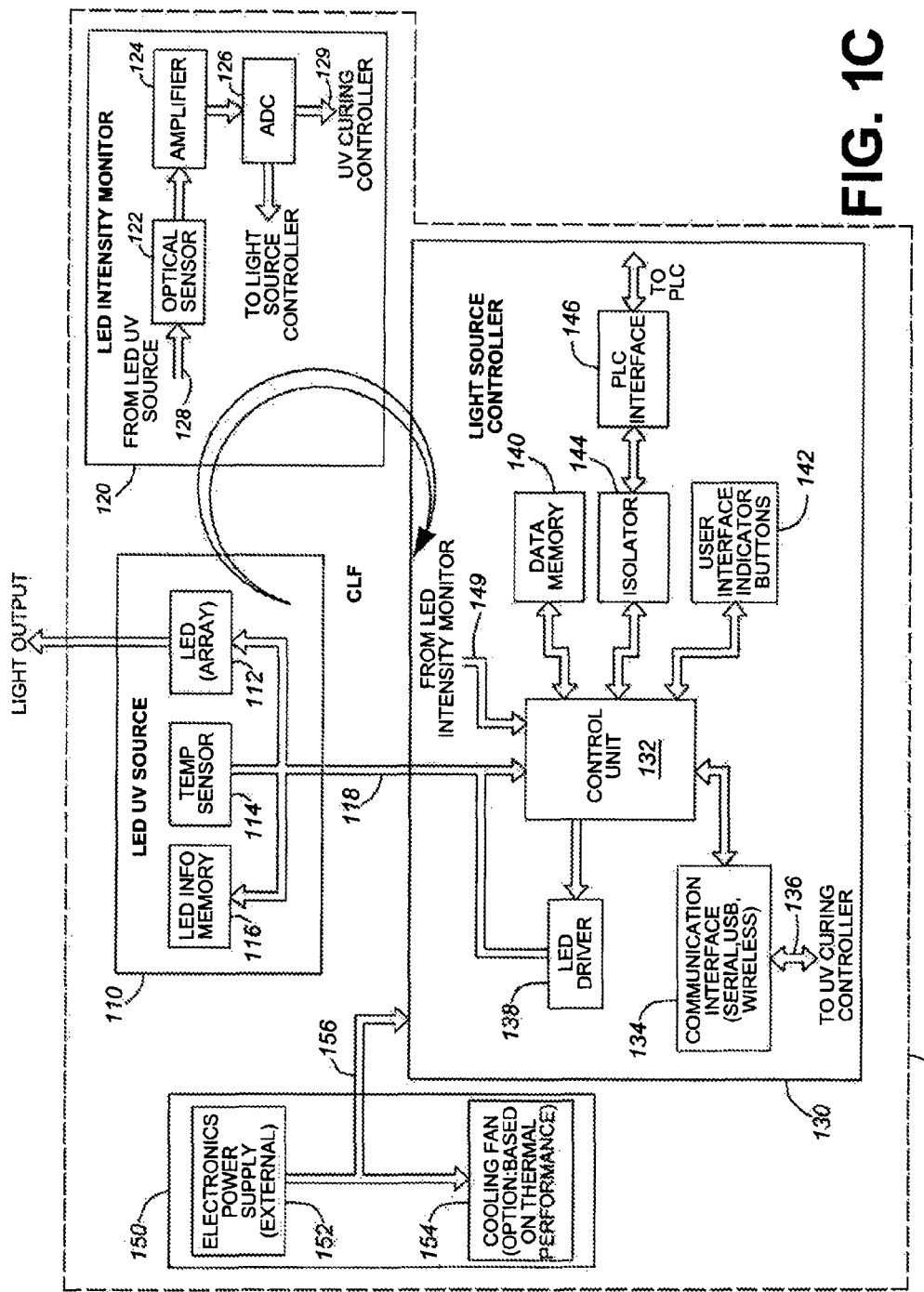
FIG. 1, illustrates a schematic block diagram a system for network management of a plurality of light sources according to a first embodiment of the present invention.

As shown in more detail in FIG. 1C, each light source unit, 100a . . . 100n, would typically comprise:

a light source 110 comprising a single LED or LED array 112, having a temperature sensor 114 and a LED information memory 116 for storing information associated with the specific LED array or light source, including e.g. a unique identifier, number of hours of operation, temperature, or other operational parameters, such as an "Intellichip" as described for example in U.S. Pat. No. 6,333,602 & U.S. Pat. No. 6,847,170 entitled "Smart light source with integrated operational parameters data storage capability";

a LED intensity monitor 120 comprising an optical sensor 122 having an input 128 from the light source 110 (e.g. as conventional, using a beam splitter (not shown) to direct a small portion of the output of the light source to the optical sensor), amplifier 124 and ADC 126 providing an output 129;

a LED light source controller 130 comprising a LED driver 138, a control unit 132, with connections 118 between the LED UV source, the LED driver 138 and control unit 132; a communications interface 134 with a port 136 for connection to the UV curing controller 200; a memory 140, user interface 142 comprising an indicator light and buttons; isolator 144 and PLC interface 146 with a port for connection to a PLC; an input 149 from the LED intensity monitor 120; also shown is a power supply unit 150, comprising a power supply 152, (and optionally a cooling fan 154 or other known cooling means) connected to the controller 130 via connection 156.

The light source unit includes a closed loop feedback (CLF) system similar to that described in U.S. Pat. No. 5,521,392 to Kennedy. A PLC (Programmable Logic Control) interface is provided to the LED light source controller as is conventional, to allow for a TTL control signal to be used, for example for an actuation signal.

Figure 1D:
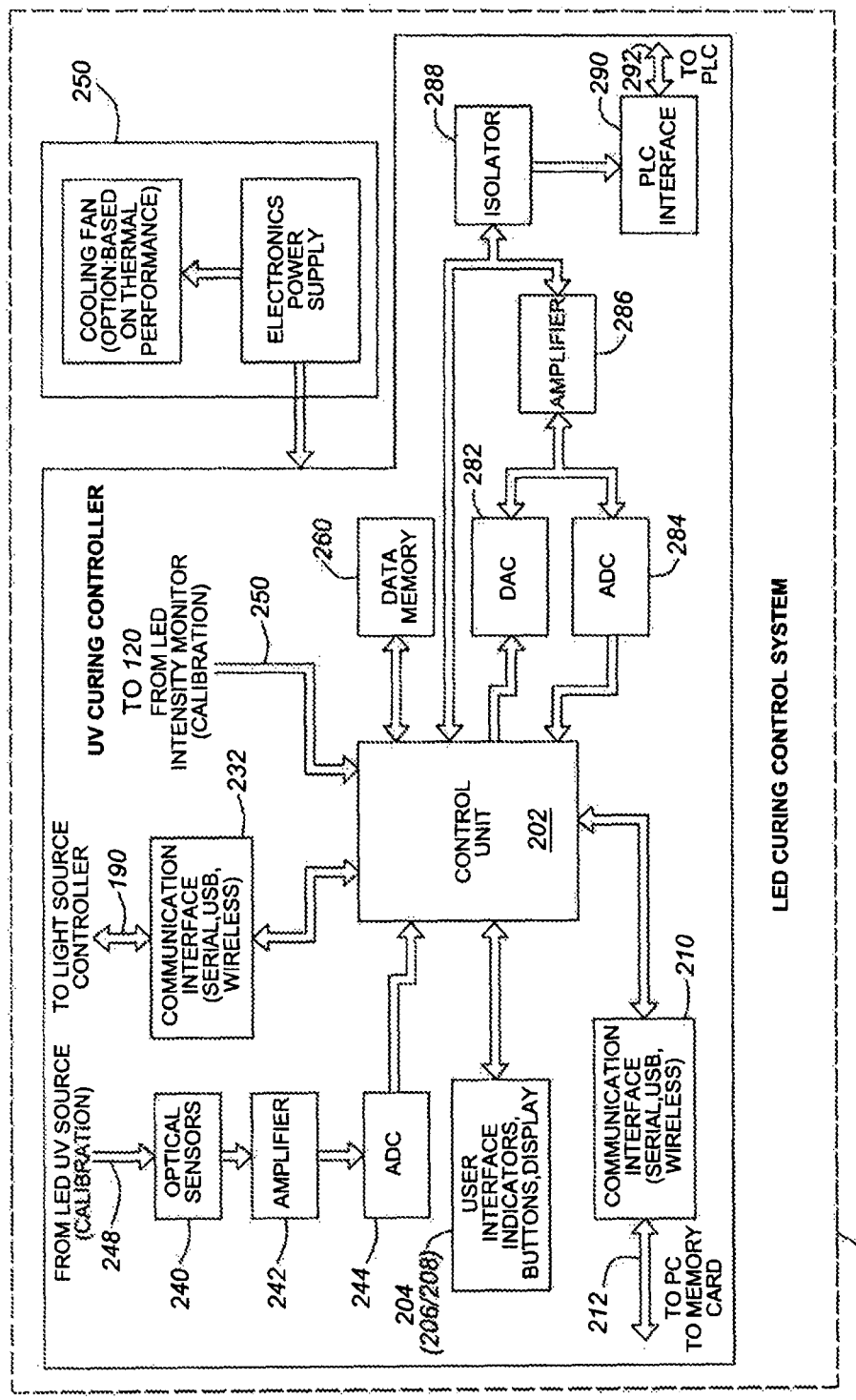
Figure 2:
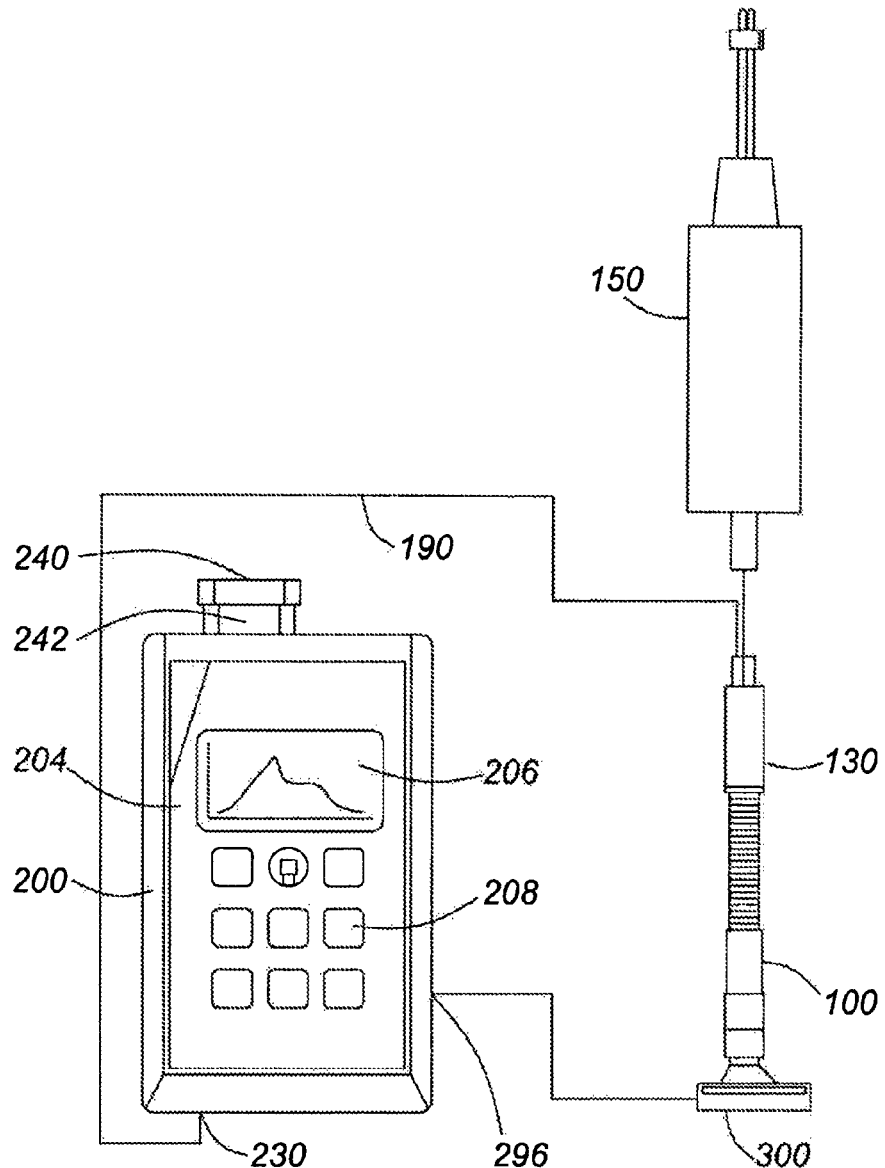
FIG. 2 illustrates a system arranged for calibration of a UV light source according to an embodiment using a portable LED curing controller, and an on-site radiometer.
Figure 3:
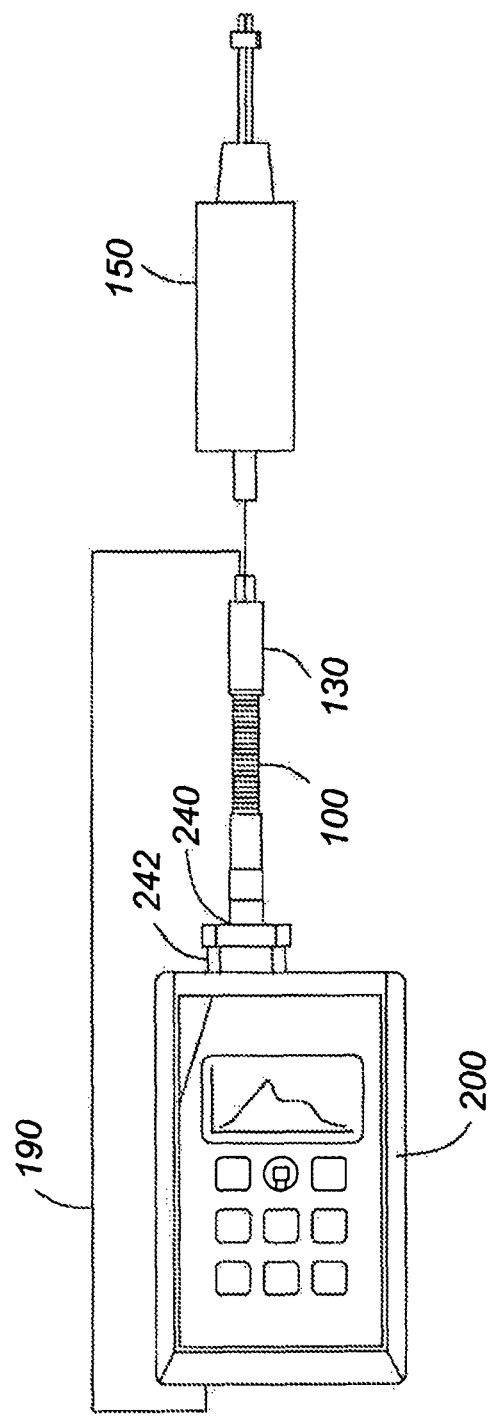
FIG. 3 illustrates a system arranged for calibration of a UV light source according to an embodiment using a portable LED curing controller using an on-board radiometer.

As shown in FIG. 1D the LED curing controller, 200 comprises a control unit including a processor 202, having user interface 204. In a preferred embodiment, as shown in FIGS. 2 and 3, the controller 200 is a mobile or portable hand held unit, and the user interface may include a graphical user interface 206 and a keypad 208. The controller 200 also typically comprises a memory 260; a communications interface 210 having a port 212 for connection to a PC memory card; a control unit 202, having an input 248 from an optical sensor 240, via amplifier 242 and ADC 246; a port 230 is provided for a communications interface 232 via connection 190 to the light source controller; a connection 250 provides for input to the control unit 202 from the LED intensity monitor 120 (FIG. 1) if required for calibration. Also provided is an interface 280 comprising a digital to analog converter (DAC) 282, analog to digital converter (ADC) 284, amplifier 286, isolator 288, PLC interface 290, and corresponding PLC port 292.

As shown in FIG. 2, a light source unit 100a is shown in use, powered by an AC adapter 150, and connected to a controller 200. In a preferred embodiment, the controller 200 comprises a handheld portable unit 200 having a user interface 204 comprising a graphical user interface 206 and a keypad 208. Also provided is an optical port 240 for an optical sensor 242 of an on-board radiometer so that the optical output of a light source unit may be coupled directly to the optical port 240 for monitoring or calibration. As shown in FIG. 2, an external radiometer 300 may alternatively be coupled to port 296, via connection 298 for measurement of the optical output of the light source unit 100. A bi-directional data transfer connection 190 is provided between the communications interface 134 of the UV light source unit 100 (see FIG. 1C) and port 230 for the communication interface 210 (see FIG. 1D) of the controller 200.

FIG. 3 shows a similar light source unit 100, and power supply unit 152, with the optical output of the light source unit coupled directly to the on-board radiometer 242 of controller 200 via the optical port 240. Also shown is the bi-directional communication connection 190 similar to that shown in FIG. 2.

Figure 4:
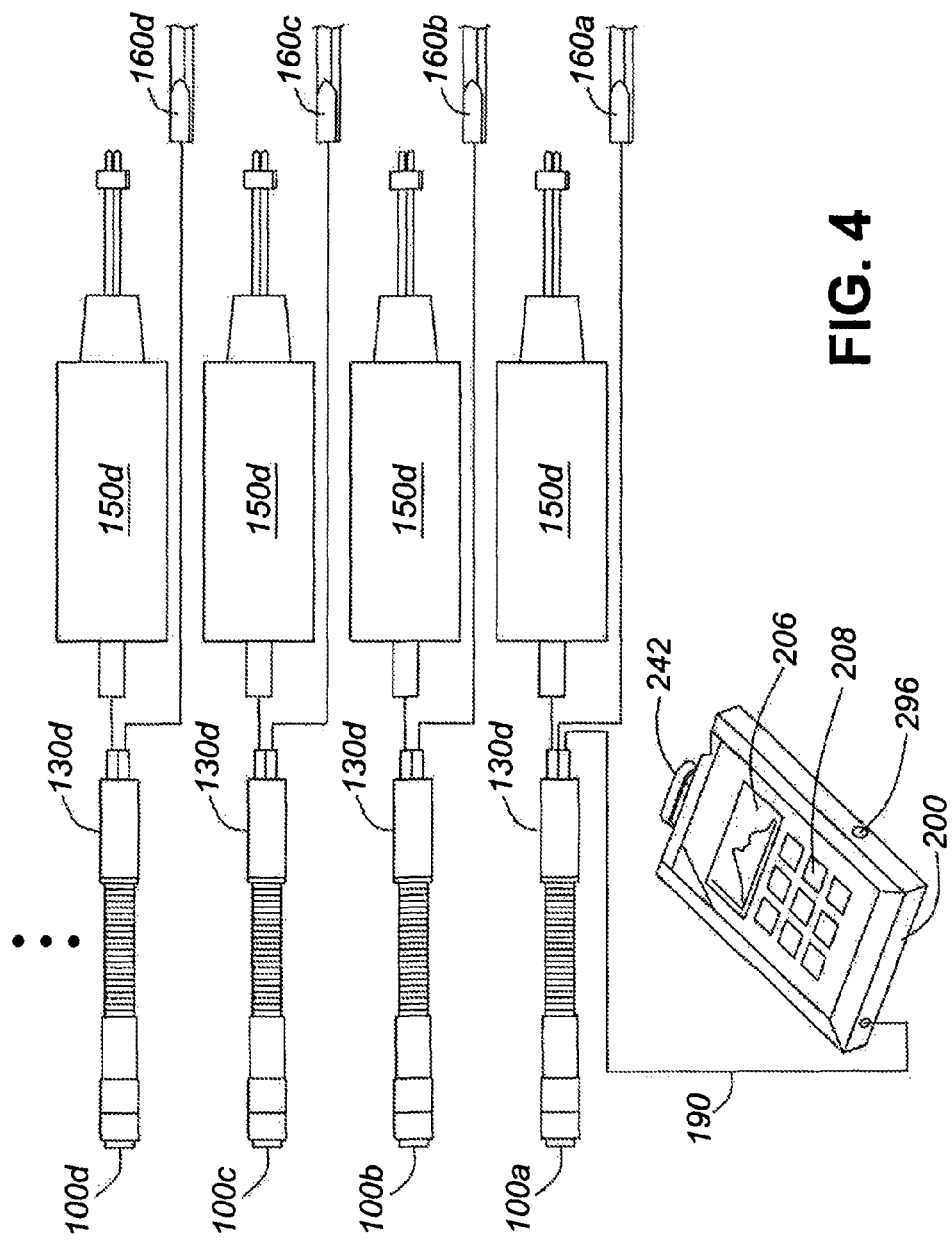
FIG. 4 shows a system comprising a plurality of LED light sources and a portable LED curing controller connected for programming of a LED light source.

As shown schematically in FIG. 4, a typical system comprises a plurality of light source units 100a, 100b, 100c, 100d . . . 100n, each comprising a LED light source 112, and each having its own respective light source controller 130a, . . . 130n, and power supply 150a, . . . 150n. In FIG. 4, each power supply 150 is shown as a separate AC adapter rather than integral with the other components of the light source unit. Cooling means, such as a fan, may be associated with a controller 130 or power supply unit 150. Each light source unit 100a, . . . 100n has a simple user interface which may comprise, as shown, a connection to an activation switch, such as a foot pedal 160, for controlling operation, and may include a set of control buttons (power on/off, or mode selection) and one or more status indicator light(s). The individual light source units 100a, . . . 100n, however do not have an interface to allow for user input for programming, which must be done remotely by connection to the controller 200. Once a light source unit at a workstation has been calibrated and programmed (as will be described below), the light source unit is operable independently of the mobile controller 200 to perform a programmed operation (e.g. a programmed dose, intensity and exposure time, and dose profile, e.g. a single, or stepped exposures).

The controller 200 is shown connected via bi-directional communications link 190 as, for example, when programming or calibrating the light unit 100a. For example, a plurality of similar or different light source unit's 100a . . . 100n may be distributed at workstations across a manufacturing facility to perform one or more similar or different photo-initiated processes.

Figure 5:
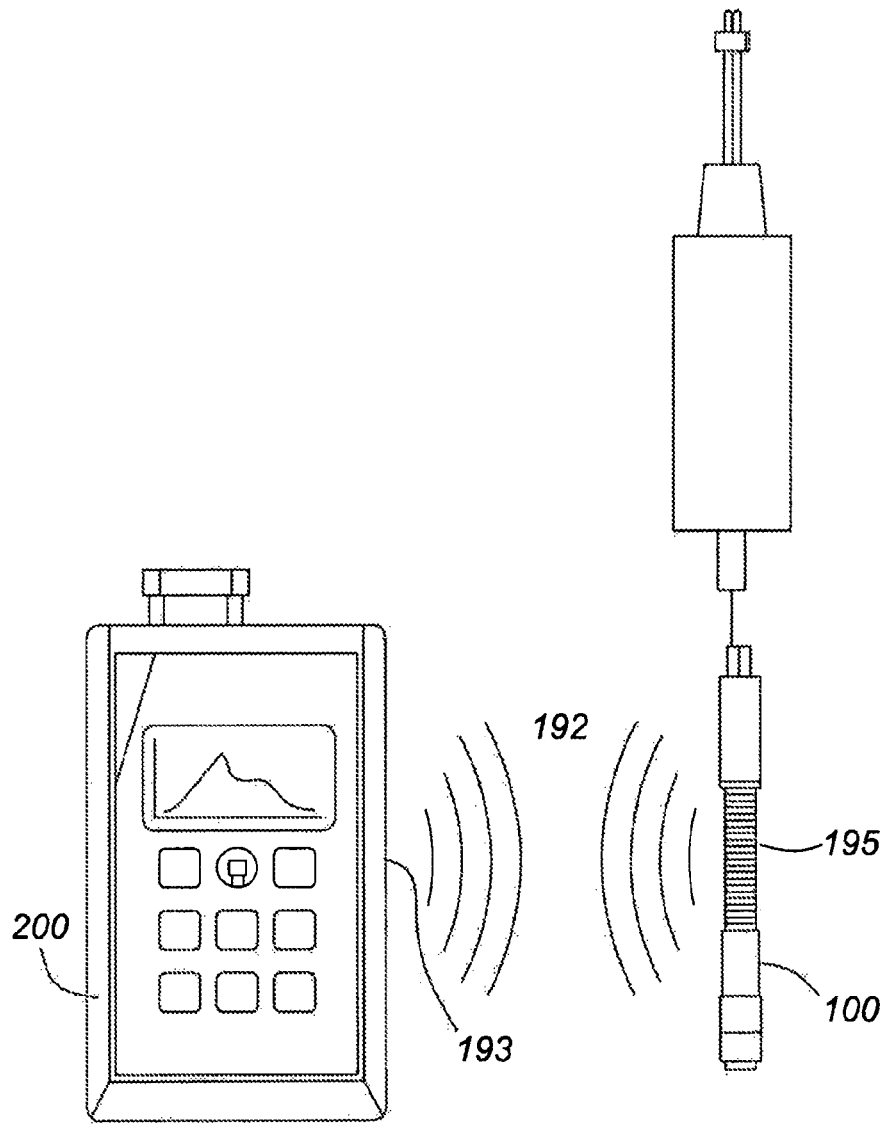
FIG. 5 illustrates wireless communication between the portable LED curing controller and a light source unit.

FIG. 5 shows a light source unit 100 coupled the controller 200 via a wireless connection 192 between wireless interfaces 193, 195, on the controller 200 and light source unit 100 respectively. Other elements of this embodiment are otherwise similar to those shown in FIGS. 3 and 4.

Figure 6:
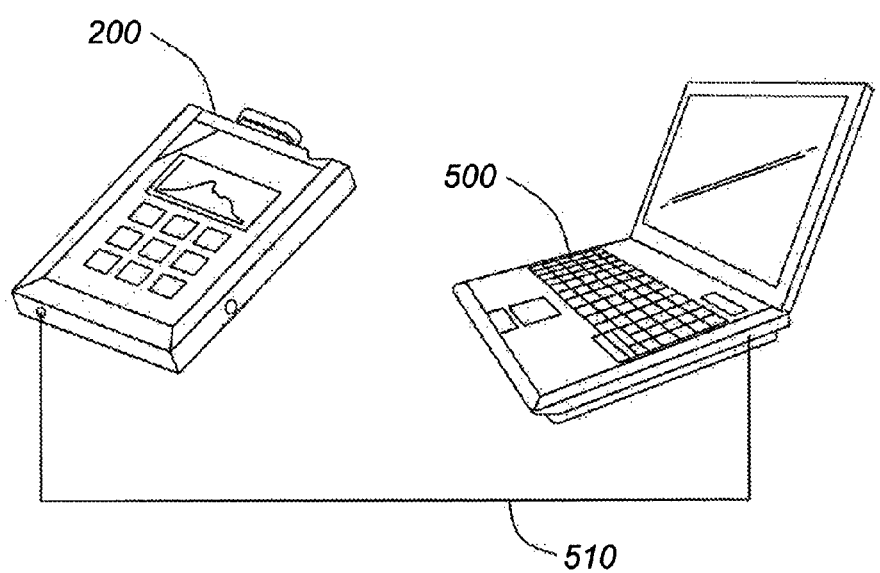
FIG. 6 illustrates connection of the portable LED curing controller and a PC.

FIG. 6 shows the controller 200 coupled to a PC 500 via a wired connection 510.

The controller 200 may be coupled to the PC for upload or download of data, and particularly for functions such as updating programs stored on the controller 200, and more data intensive activities, such as programming new exposure profiles, or data analysis which may be done more readily or conveniently using the PC user interface, i.e. keyboard and display of the PC, rather than a more limited interface (e.g. the keypad/small format display) on the handheld controller 200.

Figure 7A:
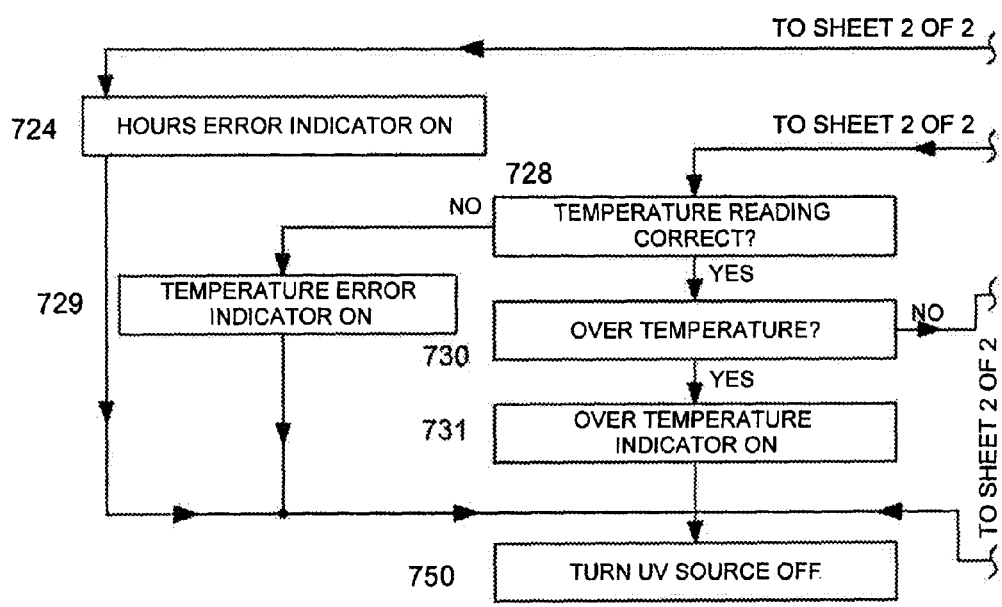
FIGS. 7A and 7B illustrate a flowchart for functions of the LED light source unit shown in FIG. 1C.
Figure 7B:
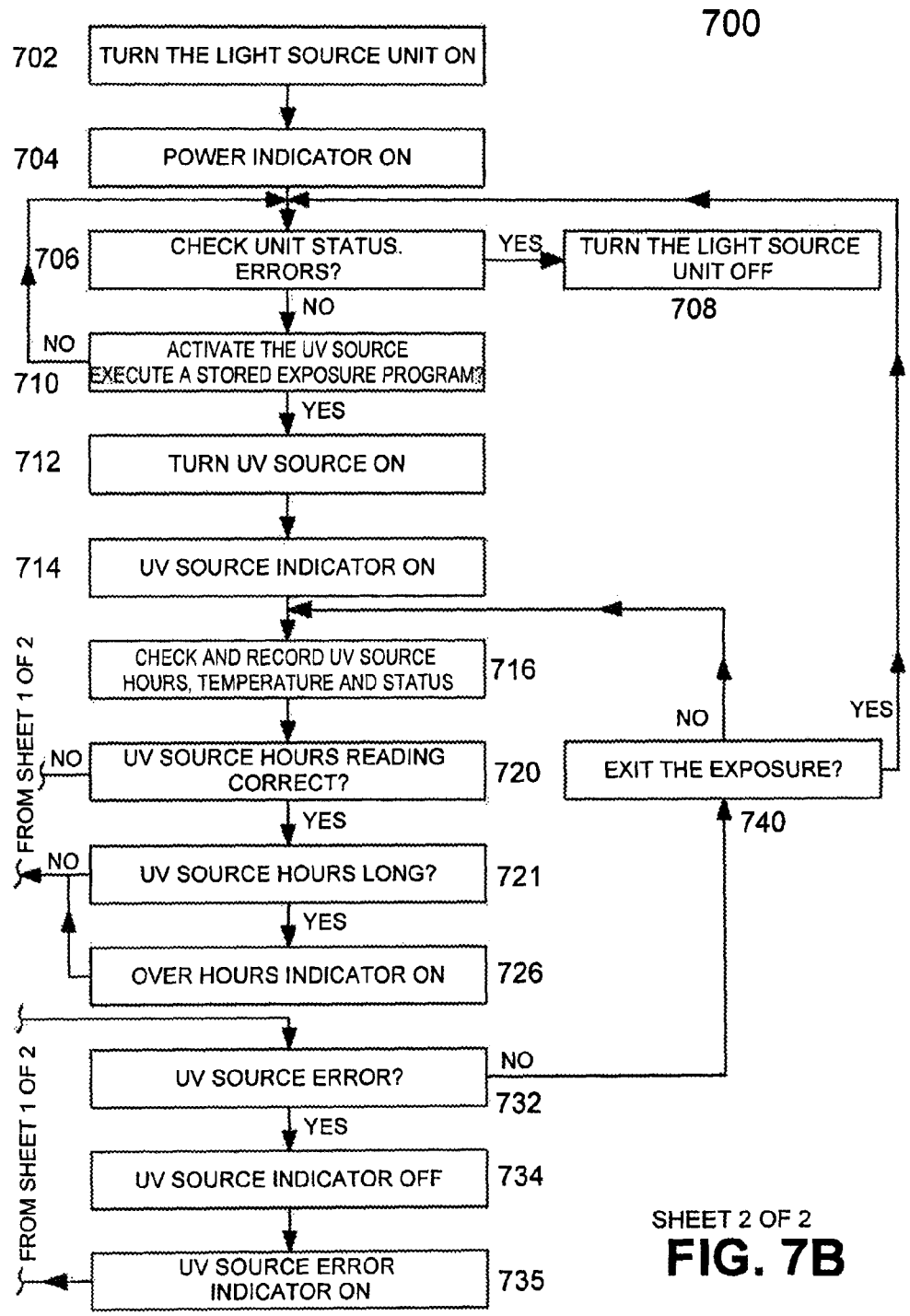

The operation of the light source unit will be described in more detail with reference to FIGS. 7A and 7B, which shows a flow chart representing steps of an operational sequence of the LED light source unit for several functions.

In a simplified embodiment of the UV light source unit, each light source unit has a memory and processor to provide the ability to execute a stored exposure program (i.e. a dose and time) as well as monitor and store operational parameters such as hours of use, numbers of exposures, and errors.

Thus, for example, a typical sequence of operation 700 comprises the following steps on activation: turn on power to the light source 702, turn on power indicator 704; check error status 706; in event of an error status, the light source unit is turned off 708, otherwise the UV source is activated 710. When a request is made to execute as stored exposure program, the UV light source is turned on 712 and the UV light source indicator light is turned on 714. The UV source hours, temperature and status are checked and recorded 716, i.e. in the LED array memory 116. If the hours and temperature and/or other parameters, if monitored, are within acceptable limits, the exposure will continue 738 until the limits (e.g. dose and time) for exiting the exposure are reached 740. If the UV source hours are not acceptable or outside error limits, an hours error indicator is turned on 724, and the UV source is turned off. Similarly, if the hours reading is long, an over hours indicator is turned on 726. The temperature is checked 728, if there is an error, a temperature error indicator is turned on 729, or if an over temperature is detected 730, an over temperature indicator is switched on 731 and the light source turned off. If another UV source error is detected 732, a UV source indicator is turned off and the UV source error indicator is turned on 734, and the UV source is turned off 750. Otherwise the UV source remains on 738 for the programmed dose and time, or other parameters of a curing/exposure profile.

Once programmed, and calibrated, the UV light source unit 100 needs only a simple user interface 142 which provides the ability to activate that specific UV light source (e.g. a foot activation switch), and provide basic indicators, typically indicator lights, such as power, activation status, and/or error status lights.

The light source may comprise closed loop feedback control, for example, as described in Kennedy U.S. Pat. No. 5,521,392. In a preferred embodiment of a light source, the closed loop feedback monitor would be calibrated via a routine calibration procedure using the controller 200.

Figure 8:
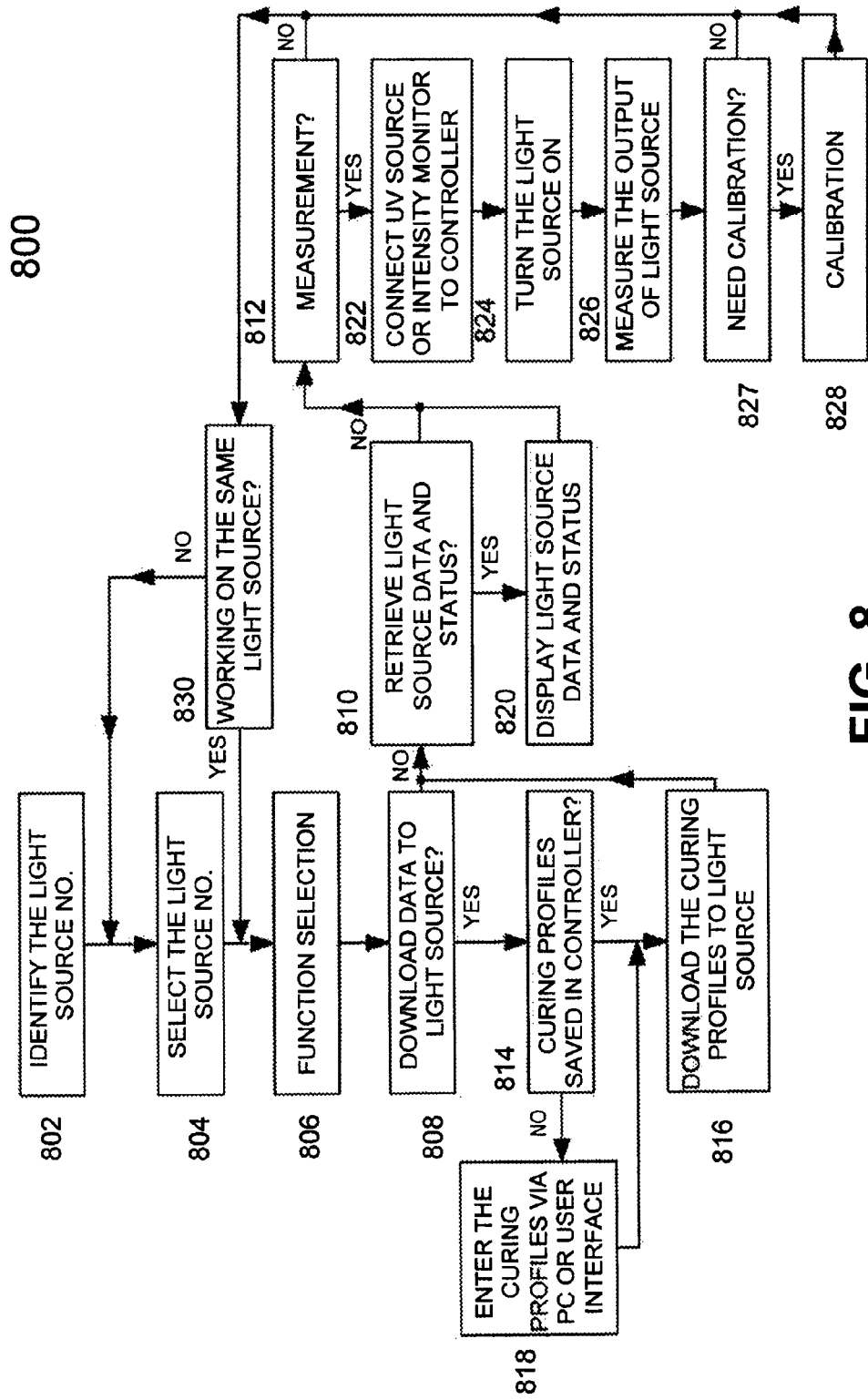
FIG. 8 illustrates a flowchart for functions of the LED curing controller shown in FIG. 1D, FIGS. 9A and 9B illustrate a flow chart for of method steps for programming a plurality of LED light source units according to a preferred embodiment of the method.

A flowchart representing a sequence 800 of steps in operation of the controller 200 is shown in FIG. 8. One or more individual light sources 100n may be connected to the UV LED curing controller 200 by a wired or wireless connection. If a wired connection is used, for example, the light sources 100n may be connected sequentially for calibrating or programming each of the light units 100n in turn. Alternatively, a wireless connection may provide for connection to one unit, or several units simultaneously. Thus, in a first step 802, the controller identifies a light source, e.g. 100a, by determining an identification number of connected light source units, and selecting 804 a particular light source identification number. One of a plurality of functions is then selected 806. For example, as shown in FIG. 8, these may include for example, download data to light source 808; retrieve light source data and status 810; or measurement 812. If download data to light source 808 is selected, and a query is issued 814 to determine if curing profiles are saved in the controller 200. If yes, the curing profiles will be transferred to the light source 816, otherwise curing profiles may be entered 814 via the user interface of the controller 200. Alternatively, curing profiles may be retrieved 818 by connection of the controller 200 to a PC, or central processing unit, where curing profiles are stored. Then, or alternatively, light source status and data may be retrieved 810 from the light source unit, and displayed 820 on the graphical user interface of the controller 200 or the PC. If measurements are to be made 812, the UV light source 100n may be optically connected 822 to the controller 200, or an separate intensity monitor 300 may be connected to the controller 200, the light source turned on 824, a measurement made of the output of the light source 826; if calibration is required 827, a calibration process is carried out 828, and then the controller queries if further steps are to be done on the same light source 830. If not, another light source 100b will be selected for data transfer or calibration.

A calibration process may be carried out, similar to that described, for example, in Kayser US 2008/0197300. However, some of the processing is transferred or shifted from the light source unit to the portable controller. That is, determining the calibration status of the selected light source unit comprises sampling plurality of data points from the optical output of the selected light source unit, i.e. measuring a series of actual output radiance levels for each of a plurality output setting parameters of the light source unit, and in the mobile controller calculating a calibration algorithm, and transferring a corresponding calibration data array to the selected light source unit. Thus the light source unit may be programmed by the controller to output a particular light level or to be adjusted to match a specific light level.

Thus, the separate controller unit 200 works in conjunction with each individual UV light source 100a to 100n for network management of the plurality of light source units, e.g. for downloading the curing parameters to the individual light sources (process parameters selectable from a menu of stored curing profiles), retrieving exposure history data from the UV light source, as well as retrieving other operating and error signals from the UV light source.

In a simplified embodiment, the controller 200 would include a more minimal, simplified user interface, but sophisticated enough to enter the cure profiles, either manually, or via a link to a computer. For example it may be more convenient if curing profiles are download from the PC to the controller 200 and stored, and then they may be transferred from the controller for programming of the light source units Similarly, the controller may be used to view all or a subset of the retrieved data from each of the individual UV sources, but data intensive functions, or analysis, may more conveniently be carried out by upload of retrieved data from the controller to the PC. The controller 200 would also require a means of interfacing to each UV light source, i.e. a wired or wireless bi-directional data connection, as well as an optical input port for monitoring optical output of the light source. In a simplified embodiment, a basic configuration, the controller would only communicate to one UV source at a time. In a preferred embodiment having more advanced configuration, the controller would communicate simultaneously with multiple UV light sources, allowing for simultaneous management of a plurality of light sources, e.g. programming of groups of light sources and simultaneous monitoring of the same.

Figure 9A:
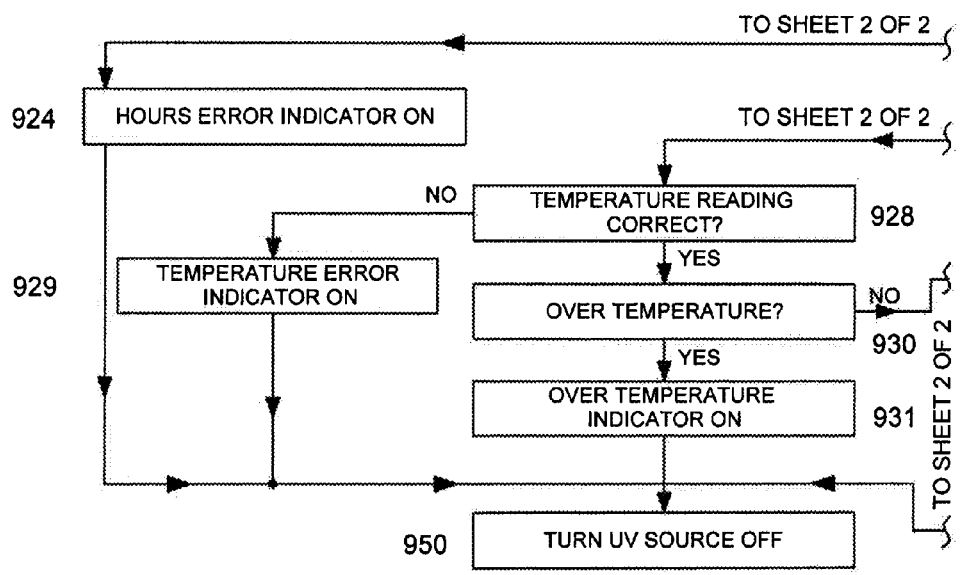
Figure 9B:
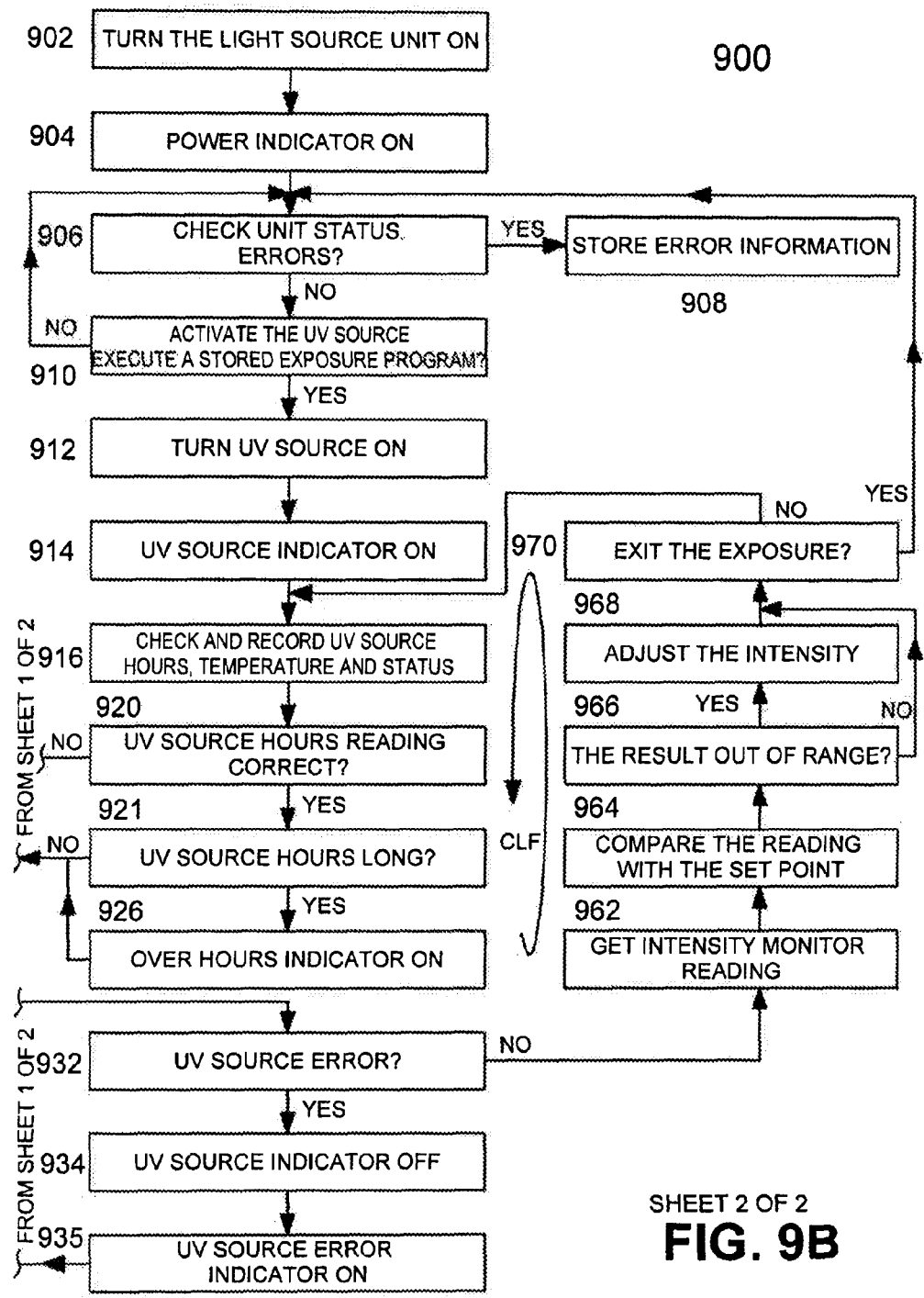

A flowchart representing a sequence 900 of steps in operation of the controller 200 for programming of the LED light units (LED heads) 100n, is shown in FIGS. 9A and 9B. Thus, one or more light sources 100n are connected, e.g. by a wired or wireless connection, to the controller 200. A light source is selected (see FIG. 8) and then the light source is turned on 902, the power indicator is turned on 904, and the unit is checked for status and errors 906. A similar sequence of steps 910-935 may carried out as described with reference to similar steps 710 to 735 in FIGS. 7A and 7B, including a sequence of checking and recording the UV source hours, temperature and status 916, and subsequent steps to indicate errors if needed. If UV source hours, temperature and other status parameters are acceptable, an intensity monitor reading is taken 960, this reading is compared with the stet point 962, to determine if the result is out of range 966 or in range 968. If the result is out of range, the intensity is adjusted, and the sequence of checking and recording uv source hours, temperature and status, and intensity monitoring, steps 916 to 960 are repeated, the controller providing a closed loop feedback system to appropriately adjust the intensity, then exiting the exposure or performing a next exposure.

In the embodiments described above, the UV light source controller 130 is shown integral with the UV LED light source and power supply 150 is shown as a separate unit, optionally including a fan or other thermal management system, but alternatively these elements may be integral with the UV LED source, or external and remote from the UV source connected via an appropriate connection means 154.

Beneficially, the controller 200 includes a sensor means for measuring the output of the (UV) light sources as part of a calibration process. The process would involve an individual UV light source being physically (i.e. optically) engaged with the controller for the purpose of collecting all or a representative portion of the light generated by the light source. The engaged light source would be activated, and a relative signal derived by the sensor within the controller from the resulting UV light. The relative signal could then be used within the controller 200 to determine if the UV light source is operating within acceptable operation parameters, and to communicate calibration data to the UV light source under test.

In a more advanced implementation of the controller 200, it would also provide a means to of calibrating the sensor contained within the controller used in the process of calibration of the individual UV light sources. This calibration would enable the programming of absolute values for the calibration parameters for each UV light source subsequently calibrated. The use of absolute values (Watts for instance) would provide for ease of consistent transfer of processes to multiple curing systems, provide greater integrity to the exposure data stored within each UV light source, and allow for a consistent interpretation of said data once retrieved and displayed using the controller.

Thus, a system according to embodiments of the present invention provided for network management of a plurality of light source units, where the intelligence of the system for managing operation and control is distributed between the controller, which acts as a hub of the network for monitoring, calibration and programming of light source units 100*n*, which have sufficient intelligence to enable them to be operated independently in a distributed environment, when not connected to the controller 200.

Figure 10:
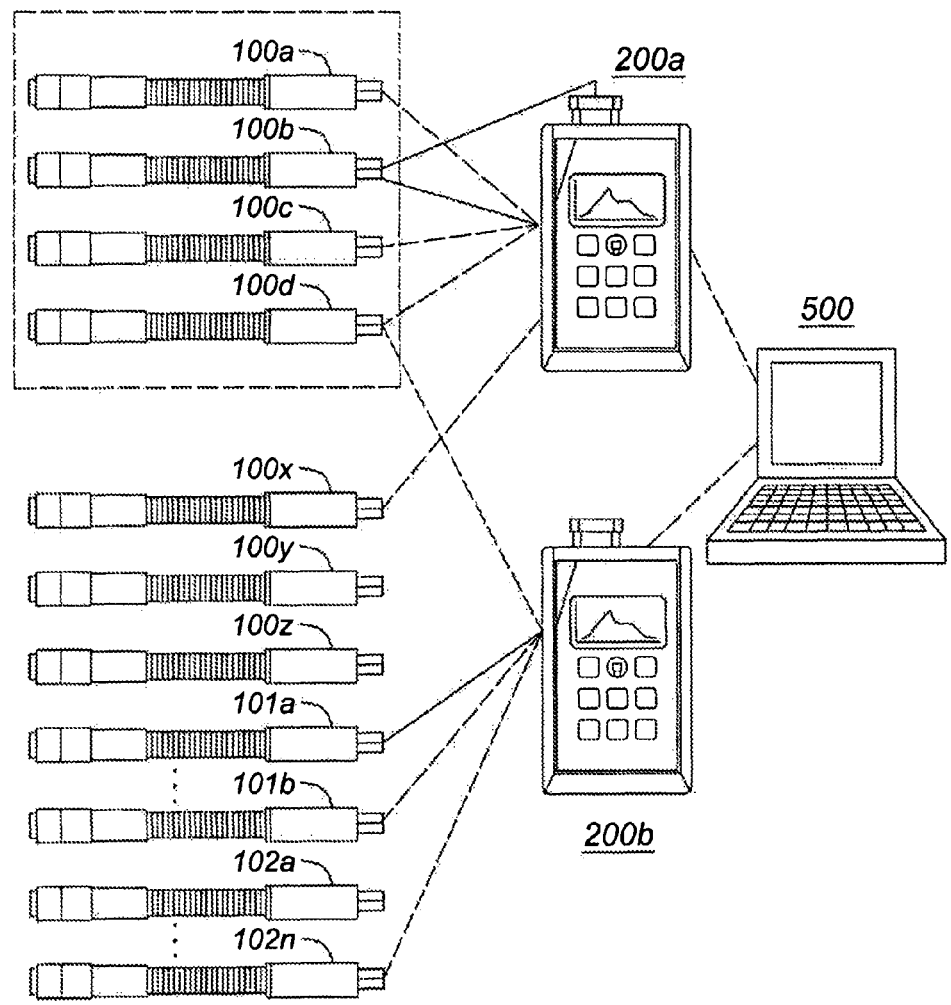
FIG. 10 illustrates schematically a network diagram or network architecture for a system according to another embodiment of the invention.

As shown in FIG. 10, a schematic network diagram showing a portable controller 200*a* and optionally another controller 200*b* e.g. in a second manufacturing area, providing a hub with data communication links (wired, wireless, optical) to a plurality of light source units 100*a* . . . 100*n*; 101*a* . . . 101*b*; and 102*a* . . . 102*n*. These light source units may be all of the same type, or may include different types of light source units, and could be used in the same or different processes. For example lights sources of different types may be used emitting different UV wavelengths, or other wavelengths, for different curing process steps. All light sources may be centrally controlled by one controller. Also provided is a communications link between each controller 200*a* and 200*b*, and a PC 500 providing centralized CPU/memory. The PC 500 provides, e.g. for control and analysis, data consolidation and distribution, and provides for data transfer, via a controller 200*a* or 200*b* from/to all light source units.

This system provides a networked approach to management of a large number of similar light source units or groups of different types of light source units in a manufacturing environment, and a portable controller 200 provides improved control for monitoring, calibration, and programmability at lower cost than known systems. The system has advantages where many workstations are spread over a wide geographic area. For example, where there are multiple, e.g. 15 or 50 or more light source units, each having simpler integral controls or intelligence, but each is not individually a smart lamp. That is, each light source unit requires only minimal user controls for operation for photo-curing or other photo-initiated applications.

Thus, the system, method and controller of embodiments of the present invention provide a common shared control for high-level commands, in a mobile controller 200 which may be portable, and/or wirelessly connectable to the light source units to perform control functions, including monitoring, calibration and programming, while operating functions of the light source can be carried out independently of the controller. Thus the portable controller 200 needs to make a connection with the light source unit only for performing the control functions, and can then be disconnected.

A portable remote controller having a radiometer with optical or electrical coupling enables management of functions, such as monitoring, data collection, calibration, programming, which in other known systems would typically be provided by a dedicated light source unit controller for each light source (an expensive option, where each unit has more processing power than needed) or by a fixed centralized controller which controls a group of a limited number of similar light sources, while providing greater flexibility for distributed arrangement of a multiplicity of light sources. Thus the processing power/intelligence of the system is more economically and flexibly distributed, with the portable remote controllers acting as hubs for network management of many light source units, and therefore provides a system which is thereby scalable to a much larger number of light source units.

Systems according to embodiments of the present invention are less expensive to implement than smart lamp systems, in which each light source unit operates independently with its own power unit and its own controller, so that intelligence and control systems must be replicated at each workstation. When the processing power and intelligence is not in use continuously, such systems are wasteful and not economical. On the other hand, in other known systems using a central control unit to manage several light sources, the light sources must remain connected to, and rely on, the central unit for intelligence and processing power and cannot operate independently without a continuous connection to the central controller. Such systems not suitable for widely distributed environments. By providing a mobile controller according to embodiments of the present invention, which may be selectively or sequentially connected to one or more light source units for monitoring, calibration and programming functions, each light source may be provided more economically with a reduced functionality to allow for operation independently of the controller once programmed, but much of the processing power and common control functions are provided by the portable controller, which also allows for a larger number of light sources to be similarly and consistently managed.

For example, the system allows for synchronization of multiple light sources replicating the same output for consistency of processing which requires high repeatability at many different workstations. The system provides for programming of groups of light source units for batch and large scale processing, using multiple function lamps at one workstation, or one workstation for one function.

Systems and methods according to embodiments of the present invention has applicability for processes depending on photo-activated materials such as adhesives, inks, coatings, and dyes, wherein the light source includes intelligence to upload light dose profiles for time, intensity, power. While systems and methods have been described with specific reference to UV LED light sources, suitable light sources units for different curing or photo-activated processes, may comprise UV LEDs and LED arrays, visible LEDs, e.g. blue ~400 nm LEDs, visible LED arrays, or other suitable light sources of different wavelengths.

The light dose profiles are downloaded from a remote portable programming source i.e. a mobile controller. The remote portable programming source has built in intelligence capable of metering (or reading) and calibrating the dose of light being emitted by the light source. The light source network may comprise a plurality of light sources that can operate independently of each other, and each has at least a common set of built-in intelligence and functionality, sufficient to operate independently in use, after they have been programmed. However, monitoring, calibration and programming require connection to a controller.

In the case of an R&D center or a manufacturing environment for assembly applications using photo reactive adhesives the light source can be set up to operate within single or multiple work stations. The remote portable programming source is connected to each station via removable wire cable connected at either end using a connector such as USB or wireless communication. The user can program all of the standalone light source assembly workstations with the same dose program and validate that the light source is performing the downloaded program by turning the light source on and emitting the light onto a detector that is incorporated into the remote portable programming source.

INDUSTRIAL APPLICABILITY

A system, method and portable controller according to embodiments of the present invention provide for network management of operational and control functions of multiple light sources, e.g. control, setup, data collection, programming and calibration at a fraction of the cost of known systems.

Applications include industrial processes using photo-activated processes and UV curing processes, particularly those requiring monitoring and calibration to ensure consistency and provide a highly repeatable operation across a single or multiple work stations.

Lower cost, simplified light source units or modules can be used, with centralized distributed control provided by a portable remote controller, while providing ease of use and increase functionality for managing monitoring, calibration, control, and programming of multiple units. The system is scalable from 1 to 1000s of light sources, such as used in mass production and assembly environments.

Other applications of the system, method and portable controller for network management of multiple light source units and processes would be, for example, in a integrated ink printing stations, coating stations, and/or systems used for fluorescing dyes or stains used in microscopy.

Although embodiments of the invention have been described and illustrated in detail, it is to be clearly understood that the same is by way of illustration and example only and not to be taken by way of limitation, the scope of the present invention being limited only by the appended claims.

The invention claimed is:

1. A system for management of a plurality of light source units for photo-activated/curing applications, comprising:
a plurality of light source units (100a . . . 100n), each having a data communications interface (134);
a mobile controller (200) having a corresponding data communications interface (232) and control means (202) for selectively establishing a network connection (190) with a light source unit, and for monitoring, calibration, and programming each light source unit;
each light source unit (100a . . . 100n) being remotely programmable by the controller (200) via said network connection (190) to program an exposure profile, and operable independently of the controller for delivering said programmed exposure profile; and
the mobile controller (200) comprising a user interface (204) for controlling, monitoring, calibration, and programming of each of the plurality of light source units.

2. A system according to claim 1 where the control means (202) of the mobile controller (200) comprises means for programming each light source unit with an exposure profile comprising an intensity and an exposure time.

3. A system according to claim 1 wherein the mobile controller further comprises a radiometer (240,242,244) having an optical port (248) for monitoring optical output from one of the plurality of programmable light source units.

4. A system according to claim 1 wherein the controller further comprises an input port (240) for coupling to a radiometer for monitoring optical output from at least one of the plurality of programmable light source units.

5. A system according to claim 1 wherein each light source unit (100a . . . 100n) has a unique identifier, and the controller comprises means for establishing communication with a selected one of the plurality of light source units connected to the controller for at least one of monitoring, calibration, control, and programming of said selected light source unit.

6. A system according to claim 5 wherein the communications interface (232) of the controller provides for temporarily establishing a wired or wireless network connection for bi-directional communication with each of the plurality of light source units.

7. A system according to claim 6 wherein the communications interface (232) provides for sequential connection of each light source unit to the controller.

8. A system according to claim 6 wherein the communications interface (232) provides for simultaneous connection of a group of the plurality light source units to the controller.

9. A system according to claim 1 wherein the system comprises a central processing unit (500), and the controller (200) further comprises interface means (210) for establishing a network connection with the central processing unit 500 for transferring of exposure profile data and light source data between the central processing unit (500) and individual light source units (100a . . . 100n), via the controller (200).

10. A light source unit for the system of claim 1 having a bi-directional communications interface for network connection to a controller, and the light source unit being remotely programmable by the controller via said network connection to program an exposure profile, and operable independently of the controller for delivering said programmed exposure profile, and further comprising:
power connection and control means (150);
memory means (140) for storing at least one exposure profile comprising time and intensity information for delivering a programmed photon dose; and
activation means (160) for executing a stored exposure profile.

11. A light source unit according to claim 10 further comprising monitoring means (120,114,116) for monitoring operational parameters of the light source for at least one of intensity, temperature, hours of use and other operational parameters.

12. A light source unit according to claim 11 further comprising feedback means (110,120,130) for determining an operational status dependent on said operational parameters, and means (142) for indicating said operational status.

13. A light source unit according to claim 12 wherein the light source unit further comprises control means (132) for adjusting an intensity of the light source to maintain an operational status.

14. A light source unit according to claim 13 capable of storing a plurality of exposure profiles (140), and further comprises means (142) for selecting one of said plurality of stored exposure profiles.

15. A mobile controller (200) for management of a network comprising a plurality of remotely programmable light source units (100a ... 100n) for photo-activated/curing applications, each light source unit having a communications interface (134), the controller (200) comprising:
- interface means (232) for selectively establishing bi-directional communication with individual ones of the plurality of remotely programmable light sources;
- control means (202) for monitoring, calibrating and programming exposure parameters of said light source units, and
- a user interface (204) for controlling said communication, monitoring, calibration and programming means.

16. A mobile controller according to claim 15 wherein the means for programming exposure parameters comprises means for programming an exposure profile comprising an intensity and an exposure time.

17. A mobile controller according to claim 15 further comprising a radiometer having an optical port for monitoring optical output from one of the plurality of programmable light source units.

18. A mobile controller according to claim 15 further comprising an input port for coupling to a radiometer for monitoring optical output from at least one of the plurality of programmable light source units.

19. A mobile controller according to claim 15 comprising means for determining a unique identifier of a light source unit.

20. A mobile controller according to claim 15 wherein the interface means provides for temporarily establishing a wired or wireless network connection for bi-directional communication with each of the plurality of light source units.

21. A mobile controller according to claim 20 wherein the interface means provides for sequential connection of each light source unit to the controller.

22. A mobile controller according to claim 20 wherein the interface means provides for simultaneous connection of a group of the plurality light source units to the controller.

23. A mobile controller according to claim 15 wherein further comprising interface means (210) for communicating with a central processing unit (500), and for transferring of exposure profile data and light source data between the central processing unit (500) and individual light source units (100a ... 100n) via the controller.

24. A method for managing a plurality of remotely programmable light source units, for photo-activated/curing applications, each light source unit having a communications interface, the method comprising, via a mobile controller performing the steps of:
- establishing a network connection with at least one of said plurality of remotely programmable light source units;
- identifying a selected one of said plurality of light source units;
- selecting one of monitoring, calibrating and programming functions;
- performing a selected function of at least one of monitoring, calibrating and programming the selected light source unit.

25. A method according to claim 24 wherein programming the selected light source unit comprises transferring, via said network connection, exposure profile data from the controller into memory of the selected light source.

26. A method according to claim 24 wherein exposure profile data is stored by a central processing unit, and transferring the data to the selected light source comprises retrieving data from the central processing unit, and then transferring said data, via said network connection, from the mobile controller to the light unit.

27. A method according to claim 24 wherein calibrating the selected light source unit comprises sampling output of a radiometer coupled to the optical output of a selected light source unit, determining the calibration status of the selected light source unit, and if calibration is required, transferring calibration data to the selected light source unit.

28. A method according to claim 27 wherein determining the calibration status of the selected light source unit comprises sampling plurality of data points from the optical output of the selected light source unit, and in the mobile controller calculating a calibration algorithm, and transferring a calibration data array to the selected light source unit.

29. A method according to claim 24 wherein monitoring the selected light source unit comprises retrieving light source data and status information from the light source unit, and displaying or otherwise processing said information at the controller.

30. A network management system for managing a network of a plurality of remotely programmable light source units (100a ... 100n) for photo-activated/curing applications, the system comprising:
- a central processing unit (500), and at least one mobile controller (200a, 200b) for interfacing the central processing unit (500) and the plurality of remotely programmable light source units (100a ... 100n);
- the mobile controller comprising interface means (232) for establishing communication with selected individual ones of said plurality of light source units and control means (202) for control, monitoring, calibration and programming thereof, and a user interface (204) for managing said interface means and control means.

31. A system according to claim 30, wherein each light source unit comprises one of a UV LED, a UV LED array, a visible LED, and a visible LED array.

32. A system according to claim 1 wherein each light source unit comprises one of a UV LED, a UV LED array, a visible LED and a visible LED array.

* * * * *